(12) United States Patent
Yang et al.

(10) Patent No.: US 10,520,764 B2
(45) Date of Patent: Dec. 31, 2019

(54) DISPLAY SCREEN, DISPLAY DEVICE AND MOBILE TERMINAL

(71) Applicant: GUANGDONG OPPO MOBILE TELECOMMUNICATIONS CORP., LTD., Dongguan (CN)

(72) Inventors: Le Yang, Dongguan (CN); Haiping Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 22 days.

(21) Appl. No.: 15/854,956

(22) Filed: Dec. 27, 2017

(65) Prior Publication Data

US 2018/0314096 A1 Nov. 1, 2018

(30) Foreign Application Priority Data

Apr. 27, 2017 (CN) .......................... 2017 1 0292547

(51) Int. Cl.
*G02F 1/1333* (2006.01)
*G06F 3/041* (2006.01)
(Continued)

(52) U.S. Cl.
CPC .... *G02F 1/13338* (2013.01); *G02F 1/133512* (2013.01); *G06F 3/041* (2013.01);
(Continued)

(58) Field of Classification Search
CPC ........... G02F 1/133512; G02F 1/13338; G06F 3/0412; G06F 21/32; G06F 3/041; H01L 27/323; G06K 9/0004
See application file for complete search history.

(56) References Cited

U.S. PATENT DOCUMENTS 6,327,376 B1 12/2001 Harkin
2010/0220900 A1 9/2010 Orsley
(Continued)

FOREIGN PATENT DOCUMENTS

CN 204990245 U 1/2016
CN 205015864 U 2/2016
(Continued)

OTHER PUBLICATIONS

PCT/CN2018/071316 International Search Report and Written Opinion dated Mar. 27, 2018 10 pages.
(Continued)

*Primary Examiner* — Jessica M Merlin
(74) *Attorney, Agent, or Firm* — Lathrop Gage LLP

(57) ABSTRACT

The present disclosure provides a display screen, a display device, and a mobile terminal. The display screen includes a light-shielding panel and a display panel. The light-shielding panel is provided with a hollow-out groove, and the hollow-out groove is configured so that a fingerprint module is fastened in the hollow-out groove. The display panel is superposed on a side of the light-shielding panel towards a user. A side of the display panel towards the light-shielding panel is provided with an ink layer. An orthographic projection area of the ink layer on the light-shielding panel coincides with the hollow-out groove. Chromaticity of the ink layer is consistent with chromaticity of a side of the light-shielding panel towards the display panel.

17 Claims, 4 Drawing Sheets

(51) Int. Cl.
  *G02F 1/1335* (2006.01)
  *G06K 9/00* (2006.01)
  *G06F 21/32* (2013.01)
  *H01L 27/32* (2006.01)

(52) U.S. Cl.
  CPC ............ *G06F 3/0412* (2013.01); *G06F 21/32* (2013.01); *G06K 9/0004* (2013.01); *H01L 27/323* (2013.01)

(56) References Cited

U.S. PATENT DOCUMENTS

| | | | |
|---|---|---|---|
| 2012/0170284 A1* | 7/2012 | Shedletsky | G02F 1/13318 362/355 |
| 2015/0331508 A1 | 11/2015 | Nho et al. | |
| 2016/0254312 A1* | 9/2016 | Lee | G06K 9/0004 382/125 |
| 2016/0278201 A1* | 9/2016 | Cheon | H01L 27/3272 |
| 2017/0102571 A1* | 4/2017 | Li | G02F 1/136286 |
| 2017/0124372 A1* | 5/2017 | Evans | G06F 1/1684 |
| 2017/0262686 A1 | 9/2017 | Gao et al. | |
| 2017/0344785 A1* | 11/2017 | Zhang | G06K 9/0004 |
| 2019/0102593 A1* | 4/2019 | Wang | G06F 3/0412 |

FOREIGN PATENT DOCUMENTS

| | | |
|---|---|---|
| CN | 105528568 A | 4/2016 |
| CN | 105678255 A | 6/2016 |
| CN | 105872137 A | 8/2016 |
| CN | 106096595 A | 11/2016 |
| CN | 106203412 A | 12/2016 |
| CN | 106228144 A | 12/2016 |
| CN | 106385473 A | 2/2017 |
| CN | 106412166 A | 2/2017 |
| CN | 106503635 A | 3/2017 |
| CN | 107092311 A | 8/2017 |
| TW | 201621590 A | 6/2016 |
| TW | M532056 U | 11/2016 |
| WO | WO 2017036072 A1 | 3/2017 |
| WO | WO 2018024099 A1 | 2/2018 |

OTHER PUBLICATIONS

European Patent Application No. 17210955.5, Office Action dated Feb. 5, 2019, 8 pages.
Chinese Patent Application No. 201710292547.7, English translation of Office Action dated Mar. 4, 2019, 8 pages.
Chinese Patent Application No. 201710292547.7, Office Action dated Mar. 4, 2019, 8 pages.
European Patent Application No. 17210955.5, Extended Search and Opinion dated Jul. 4, 2018, 5 pages.
Taiwan Patent Application No. 106143734, Office Action dated Sep. 10, 2018, 5 pages.
Chinese Patent Application No. 201710292547.7, Office Action dated Jul. 22, 2019, 7 pages.
Chinese Patent Application No. 201710292547.7, English translation of Office Action dated Jul. 22, 2019, 8 pages.

* cited by examiner

DISPLAY SCREEN, DISPLAY DEVICE AND MOBILE TERMINAL

CROSS-REFERENCE TO RELATED APPLICATIONS

The application claims priority to and benefits of Chinese Patent Application Serial No. 201710292547.7, filed with the State Intellectual Property Office of P. R. china on Apr. 27, 2017, the entire content of which is incorporated herein by reference.

FIELD

The present disclosure relates to a field of electronic apparatus, and particularly to a display screen, a display device and a mobile terminal.

BACKGROUND

At present, a front face of a mobile phone is usually provided with a fingerprint recognition module and a display screen, and the fingerprint recognition module is disposed outside the display screen, which is convenient for a user to operate and does not influence display of the display screen. However, with such a structure, a screen-to-body ratio is reduced due to the fingerprint recognition module, so the screen-to-body ratio of the mobile phone can be increased by superposing the fingerprint recognition module and the display screen. In order to combine the display screen and the fingerprint recognition module effectively, a hollow-out groove is disposed in a light-shielding panel of the display screen, and the fingerprint recognition module is fastened to the hollow-out groove. With such a kind of structure, however, the user can easily feel the presence of a color difference between the fingerprint recognition module and the light-shielding panel when observing the display screen, and user experience is reduced.

SUMMARY

The present disclosure provides a display screen. The display screen includes a light-shielding panel and a display panel. The light-shielding panel is provided with a hollow-out groove, and the hollow-out groove is configured to fasten a fingerprint module therein. The display panel is superposed on a side of the light-shielding panel towards a user. A side of the display panel towards the light-shielding panel is provided with an ink layer. An orthographic projection area of the ink layer on the light-shielding panel coincides with the hollow-out groove. Chromaticity of the ink layer is consistent with chromaticity of a side of the light-shielding panel towards the display panel.

The present disclosure further provides a display device, in which the display device includes the above-mentioned display screen and further includes a fingerprint module, the fingerprint module being fastened to the hollow-out groove.

The present disclosure further provides a mobile terminal, in which the mobile terminal includes the above-mentioned display device.

BRIEF DESCRIPTION OF THE DRAWINGS

To describe the technical solutions in the embodiments of the present disclosure more clearly, the accompanying drawings required for describing the embodiments are briefly introduced in the following. Apparently, the accompanying drawings in the following description illustrate merely some embodiments of the present disclosure, and those ordinarily skilled in the art can also derive other drawings from these accompanying drawings without creative efforts.

DETAILED DESCRIPTION

Figure 1:
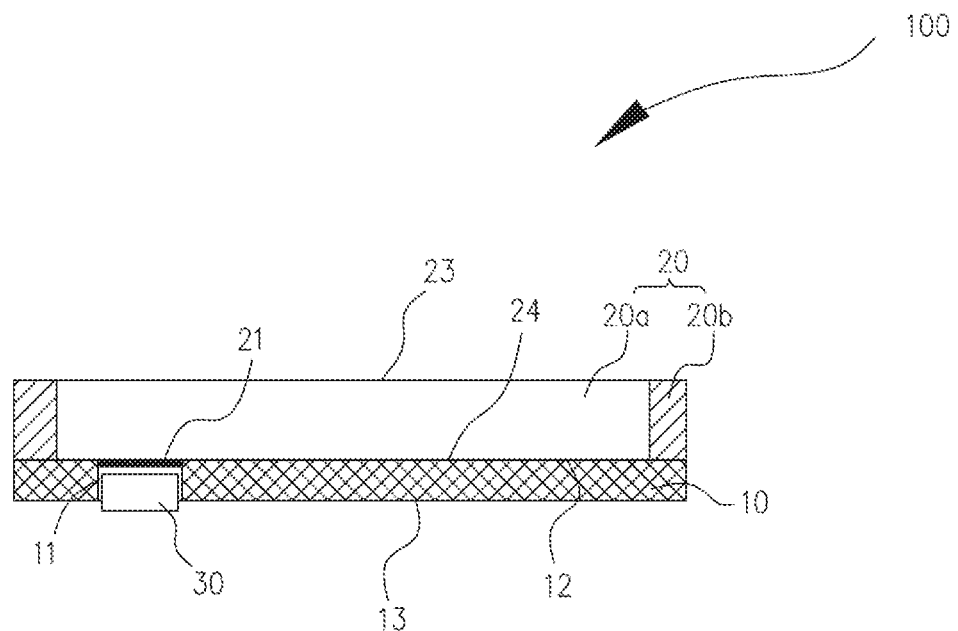
FIG. 1 is a sectional schematic view of a display screen provided in an embodiment of the present disclosure.

The technical solutions of the embodiments of the present disclosure are clearly and completely described below with reference to the accompanying drawings in the embodiments of the present disclosure. All of the other embodiments derived by those ordinarily skilled in the art without creative effort based on the embodiments in the present disclosure belong to a protection scope of the present disclosure.

In the description of the embodiments of the present disclosure, it should be understood that the orientation or the positional relationship indicated by the term "thickness" or the like is based on the orientation or the positional relationship shown in the drawings and merely for the convenience of description and simplified description of the present disclosure rather than implying or the indicating that the device or element must have a particular orientation, be constructed and operated in a particular orientation, and therefore should not be construed as limiting the disclosure.

Referring to FIG. 1, the present disclosure provides a display screen 100, including a light-shielding panel 10 and a display panel 20. The light-shielding panel 10 is provided with a hollow-out groove 11, and the hollow-out groove 11 is configured to fasten a fingerprint module 30 therein. The display panel 20 is superposed on a side of the light-shielding panel 10 towards a user. A side of the display panel 20 towards the light-shielding panel 10 is provided with an ink layer 21. An orthographic projection area of the ink layer 21 on the light-shielding panel 10 coincides with the hollow-out groove 11. Chromaticity of the ink layer 21 is consistent with chromaticity of a side of the light-shielding panel 10 towards the display panel 20. It could be understood that a visual effect when the user observes the light-shielding panel 10 through the display panel 20 and a visual effect when the user observes the ink layer 21 through the display panel 20 are consistent, so that visual appearance is integrated when the user observes the display screen 100 and the user experience is improved. The display screen 100 is applied to a mobile terminal, and the mobile terminal can be a mobile phone, a notebook computer, or a tablet computer.

With the ink layer 21 being disposed at the side of the display panel 20 towards the light-shielding panel 10 and the area of the orthographic projection of the ink layer 21 on the light-shielding panel 10 coinciding with the hollow-out groove 11, the ink layer 21 is allowed to block the fingerprint module 30, and the chromaticity of the ink layer 21 is consistent with the chromaticity of the side of the light-shielding panel 10 towards the display panel 20, which reduces the color difference between the ink layer 21 and the light-shielding panel 10 and improves the user experience.

In the present embodiment, the light-shielding panel 10 is located at a back side of the display panel 20. The light-shielding panel 10 blocks components at the back side for the display panel 20 and prevents the user from seeing the components through the display panel 20, so as to avoid an unclear display image of the display panel 20. The light-shielding panel 10 includes a first surface 12 towards the display panel 20 and a second surface 13 opposite the first surface 12. The hollow-out groove 11 runs through from the first surface 12 to the second surface 13. The fingerprint module 30 is fastened to the hollow-out groove 11 so as to prevent the light-shielding panel 10 from blocking the fingerprint module 30 from sensing a user fingerprint, that is, it is convenient for the fingerprint module 30 to sense the user fingerprint through the display panel 20. An area of the light-shielding panel 10 outside the hollow-out groove 11 is lightproof, so that a display backdrop of the display panel 20 can be formed at the area of the light-shielding panel 10 outside the hollow-out groove 11, which is convenient for the user to view the display image of the display panel 20. The hollow-out groove 11 can be adjacent to a short edge of the light-shielding panel 10. In addition, when the user uses the display screen 100 vertically, the hollow-out groove 11 can be located at a bottom of the light-shielding panel 10, so as to make it convenient for the fingerprint module 30 in the hollow-out groove 11 to acquire the user fingerprint. Certainly, in other embodiments, the light-shielding panel 10 can be provided with a plurality of hollow-out grooves 11, and the fingerprint module 30 can be fastened to each of the hollow-out grooves 11, so that the fingerprint recognition can be performed at a plurality of positions on the display screen 100.

In the present embodiment, the display panel 20 can display images, the display panel 20 is provided with a display area 20a and a non-display area 20b adjacent to the display area 20a. The display area 20a displays images. The non-display area 20b is provided with an encapsulation configuration and a circuit configuration. When the display panel 20 does not display images, the display area 20a can be pervious to light. An orthographic projection of the hollow-out groove 11 on the display panel 20 is located in the display area 20a, that is, the user can input a fingerprint at a position of the display screen 100 located in the display area 20a. The display panel 20 includes an upper surface 23 and a lower surface 24 opposite the upper surface 23. The upper surface 23 faces the user, and the lower surface 24 is attached to the first surface 12 of the light-shielding panel 10. The ink layer 21 is coated on the lower surface 24. The user can see the ink layer 21 through the display panel 20, but cannot see the fingerprint module 30 through the ink layer 21. The chromaticity of the ink layer 21 is consistent with the chromaticity of the first surface 12 of the light-shielding panel 10, so that the color difference between the ink layer 21 and the first surface 12 is reduced. The visual effects are integrated when user observes the ink layer 21 and the first surface 12 through the display panel 20.

Figure 2:
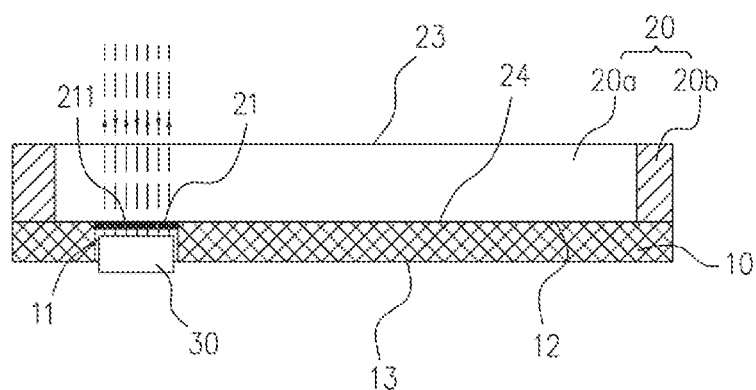
FIG. 2 is another sectional schematic view of a display screen provided in an embodiment of the present disclosure.

Further, referring to FIG. 2, the fingerprint module 30 is an optical fingerprint module, the ink layer 21 is provided with a plurality of tiny holes 211, and the plurality of tiny holes 211 are configured so that inductive light of the fingerprint module 30 can be transmitted through the plurality of tiny holes 211.

In the present embodiment, the fingerprint module 30 emits the inductive light towards the user fingerprint, the inductive light is reflected to the fingerprint module 30 by the user fingerprint after being received by the user fingerprint, and the fingerprint module 30 receives the reflected inductive light. According to time difference between the fingerprint module 30 emitting the inductive light and receiving the inductive light, a distance from the fingerprint module 30 to the user fingerprint can be calculated, that is, a distance from the fingerprint module 30 to a peak or trough of the user fingerprint can be measured, so that the image of the user fingerprint can be obtained and the user fingerprint can be acquired. A plurality of beams of inductive light can be transmitted through the plurality of tiny holes 211, that means multi-point acquisition of the user fingerprint is realized, and finally the user fingerprint image is conveniently formed. It could be understood that, the inductive light emitted by the fingerprint module 30 can be transmitted through each of the tiny holes 211, or the inductive light reflected back from the user fingerprint can be transmitted through each of the tiny holes 211, or not only the inductive light emitted by the fingerprint module 30, but also the inductive light reflected back from the user fingerprint can be transmitted through each of the tiny holes 211. Certainly, in other embodiments, the fingerprint module 30 can also be a capacitive fingerprint module.

Further, the plurality of tiny holes 211 are arranged in an array. In the present embodiment, the hollow-out groove 11 is formed to be a rectangular hole. The ink layer 21 is printed on the lower surface 24 of the display panel 20 and opposite the hollow-out groove 11. An area of the ink layer 21 outside the plurality of tiny holes 211 is formed by screen printing, so that the plurality of the tiny holes 211 in the array are formed on the ink layer 21. As the plurality of tiny holes 211 are arranged in the array, it is convenient to acquire the user fingerprint as arrayed point images, i.e. facilitating recording and recognition of the user fingerprint. Certainly, in other embodiments, the plurality of tiny holes 211 can also be arranged at random.

Figure 3:
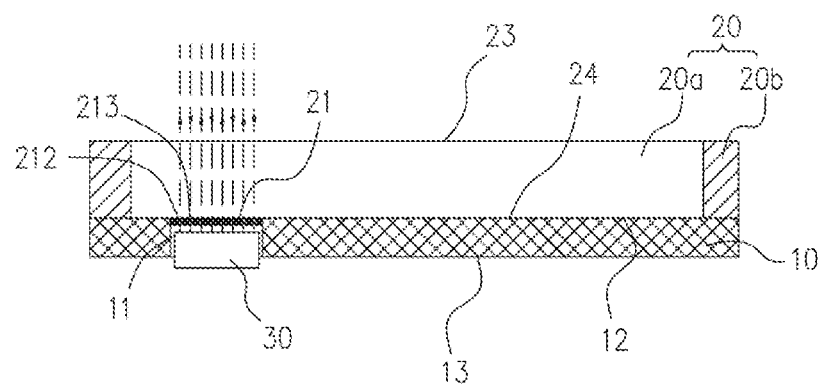
FIG. 3 is another sectional schematic view of a display screen provided in an embodiment of the present disclosure.

Further, referring to FIG. 3, the plurality of tiny holes 211 includes a first tiny hole 212 and a second tiny hole 213, the first tiny hole 212 is configured so that the inductive light emitted by the fingerprint module 30 can be transmitted outside, and the second tiny hole 213 is configured so that the inductive light reflected from the outside can be transmitted towards the fingerprint module 30.

In the present embodiment, the ink layer 21 is provided with a plurality pairs of the first tiny hole 212 and the second tiny hole 213. Each of the first tiny holes 212 and each of the second tiny holes 213 are adjacent to each other, and the inductive light sent out through the first tiny hole 212 and the reflected inductive light through the second tiny hole 213 are allowed to be independent from each other and have an improved distinguishing degree, so that the fingerprint acquisition efficiency is improved.

Further, the light-shielding panel 10 is made from foam. In the present embodiment, the light-shielding panel 10 is bonded to the lower surface 24 of the display panel 20 through an adhesive. The light-shielding panel 10 can protect the display panel 20 effectively, prevent the display panel 20 from being scratched or damaged, and can also avoid light leakage of the display panel 20. The first surface 12 of the light-shielding panel 10 appears black, the area of the ink layer 21 outside the tiny holes 211 also appears black, and the chromaticity of the first surface 12 is consistent with the chromaticity of the area of the ink layer 21 outside the tiny holes 211. Certainly, in other embodiments, the light-shielding panel 10 can also be a plastic plate.

Figure 4:
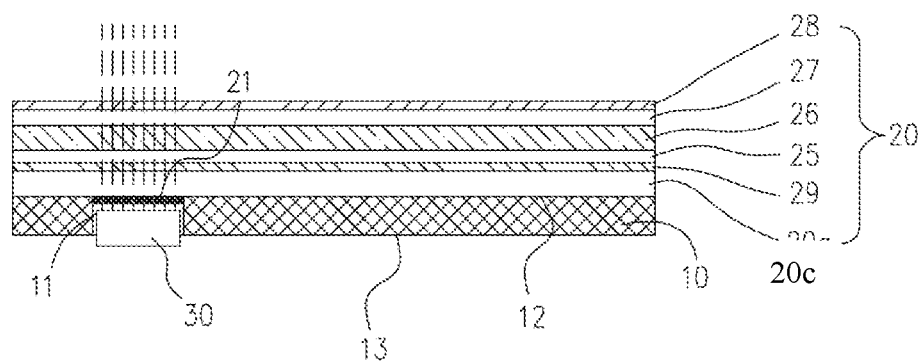
FIG. 4 is another sectional schematic view of a display screen provided in an embodiment of the present disclosure.
Figure 5:
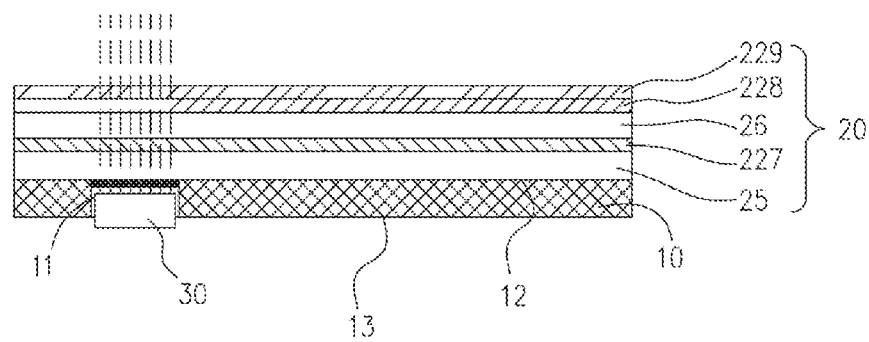
FIG. 5 is a sectional schematic view of a display screen provided in another embodiment of the present disclosure.

Further, referring to FIGS. 4 and 5, the display panel 20 includes a substrate 25 and a display layer 26, the substrate 25 is superposed on the light-shielding panel 10, and the display layer 26 is superposed on a side of the substrate 25 away from the light-shielding panel 10.

In an embodiment, as illustrated in FIG. 4, the display panel 20 is a liquid crystal display panel. The substrate 25 is a TFT (Thin Film Transistor) substrate, and the display layer 26 is a liquid crystal layer. The display panel 20 further includes a colorful substrate 27 attached to a side of the display layer 26 away from the substrate 25, an upper polarizer 28 attached to a side of the colorful substrate 27 away from the display layer 26, a lower polarizer 29 attached to a side of the substrate 25 away from the display layer 26, and a backlight source 20c attached to a side of the lower polarizer 29 away from the substrate 25. The upper surface 23 is disposed to the upper polarizer 28, and the lower surface 24 is disposed to the backlight source 20c. When the display screen 100 does not display the images, the display panel 20 can transmit the inductive light of the fingerprint module 30 so as to realize the fingerprint acquisition. Certainly, when the display screen 100 displays the images, the fingerprint module 30 emits the inductive light having a different wave length from the light of the display panel 20, and hence the fingerprint acquisition can be realized as well.

In an embodiment, as illustrated in FIG. 5, the display panel 20 is an OLED (Organic Light-Emitting Diode) display panel. The substrate 25 is a glass substrate. The display layer 26 is an organic luminescent layer. The display panel 20 further includes an anode layer 227 attached between the display layer 26 and the substrate 25, a cathode layer 228 attached to a side of the display layer away from the anode layer 227, and an upper polarizer 229 attached to a side of the cathode layer 228 away from the display layer 26. The anode layer 227 and the cathode layer 228 drive the display layer 26 to give out light. The upper surface 23 is disposed to the upper polarizer 229, and the lower surface 24 is disposed to the anode layer 227.

Figure 6:
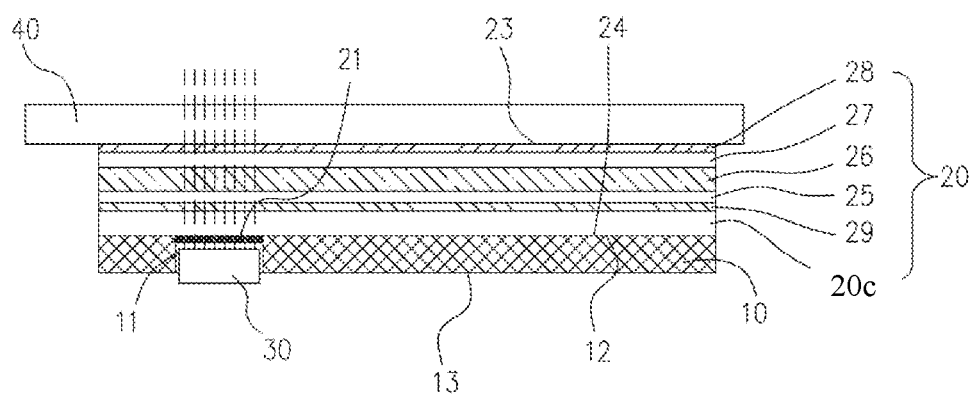
FIG. 6 is another sectional schematic view of a display screen provided in an embodiment of the present disclosure.

Further, referring to FIG. 6, the display screen 100 further includes a light-transparent cover plate 40, the light-transparent cover plate 40 is superposed on a side of the display panel 20 away from the light-shielding panel 10, and the light-transparent cover plate 40 covers the display panel 20.

In the present embodiment, the light-transparent cover plate 40 is a glass plate. The light-transparent cover plate 40 and the display panel 20 are bonded together through an optical adhesive. The light-transparent cover plate 40 protects the display panel 20 from being scratched. When the finger of the user touches the light-transparent cover plate 40 and is corresponding to the position of the hollow-out groove 11 of the light-shielding panel 10, the fingerprint module 30 acquires the fingerprint of the user's finger.

Figure 7:
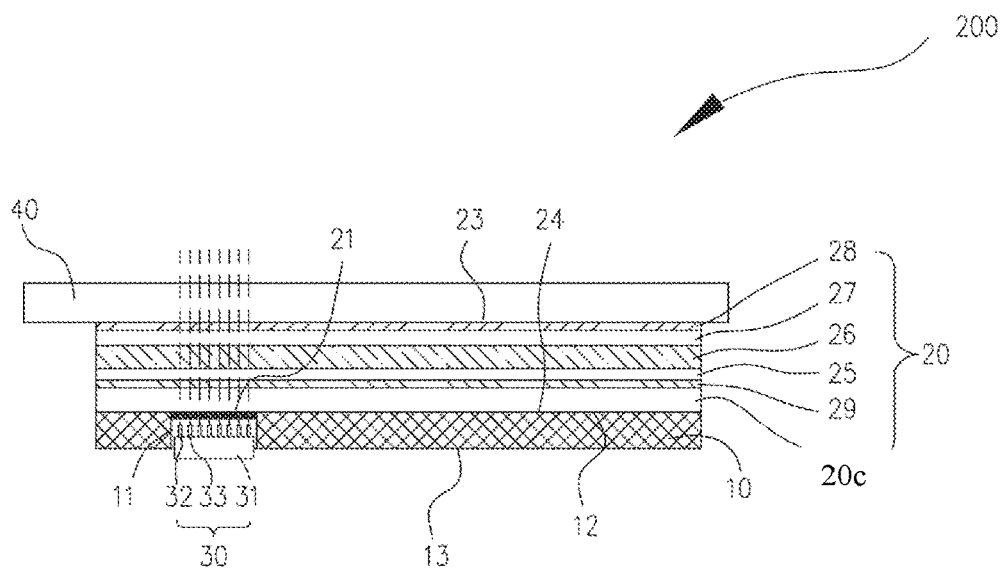
FIG. 7 is a sectional schematic view of a display device provided in an embodiment of the present disclosure.

Referring to FIG. 7, the present disclosure further provides a display device 200. The display device 200 includes the above-mentioned display screen 100 and further includes a fingerprint module 30, the fingerprint module 30 being fastened to the hollow-out groove 11.

In the present embodiment, the fingerprint module 30 is fastened into the hollow-out groove 11 and attached to the ink layer 21. The fingerprint module 30 includes a base 31, a light emitting source 32 and a light receiving source 33. The base 31 is a plate. A plurality of light emitting sources 32 is provided, and a plurality of light receiving sources 33 is provided. The plurality of the light emitting source 32 and the plurality of the light receiving source 33 are arrayed on the base 31 together. Each of the light emitting sources 32 is corresponding to the first tiny hole 212, and the light receiving source 33 is corresponding to the second tiny hole 213. The light emitting source 32 emits the inductive light towards the user fingerprint through the first tiny hole 212 and the display panel 20, and the light receiving source 33 receives the inductive light reflected from the user fingerprint through the display panel 20 and the second tiny hole 213.

Figure 8:
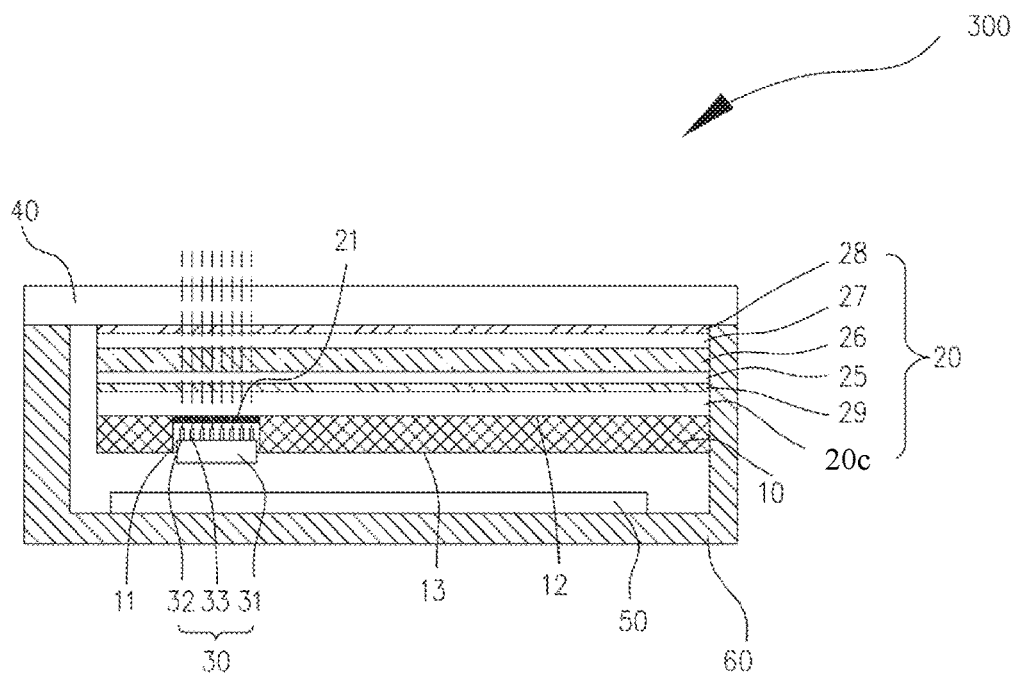
FIG. 8 is a sectional schematic view of a mobile terminal provided in an embodiment of the present disclosure.

Referring to FIG. 8, the present disclosure further provides a mobile terminal 300, and the mobile terminal 300 includes the above-mentioned display device 200 and further includes a main board 50 and a back casing 60. The display screen 100 and the back casing 60 are fitted together, the main board 50 is fastened between the back casing 60 and the display screen 100, and the fingerprint module 30 is electrically connected to the main board 50 and transmits the acquired user fingerprint to the main board 50. It could be understood that the mobile terminal 300 can be a mobile phone, a tablet computer, or a notebook computer and the like.

With the ink layer being disposed at the side of the display panel towards the light-shielding panel and the area of the orthographic projection of the ink layer on the light-shielding panel coinciding with the hollow-out groove, the ink layer is allowed to block the fingerprint module, and the chromaticity of the ink layer is consistent with the chromaticity of the side of the light-shielding panel towards the display panel, which reduces the color difference between the ink layer and the light-shielding panel and improves the user experience.

The above are the embodiments of the present disclosure. It should be noted that those skilled in the art can make some improvements and retouches without departing from the principle of the present disclosure, which are also deemed as the protection scope of the present disclosure.

What is claimed is:

1. A display screen, comprising a light-shielding panel and a display panel, the light-shielding panel being provided with a hollow-out groove, the hollow-out groove being configured to fasten an optical fingerprint module, the display panel being configured to be superposed on a side of the light-shielding panel towards a user, a side of the display panel towards the light-shielding panel being provided with an ink layer, an orthographic projection area of the ink layer on the light-shielding panel coinciding with the hollow-out groove, and chromaticity of the ink layer being consistent with chromaticity of a side of the light-shielding panel towards the display panel;
   the ink layer is provided with a plurality of tiny holes, and the plurality of tiny holes are configured so that inductive light of the optical fingerprint module is transmitted;
   the plurality of tiny holes comprises a first tiny hole and a second tiny hole, the first tiny hole is configured so that the inductive light emitted by the optical fingerprint module is transmitted outside, and the second tiny hole is configured so that the inductive light reflected from the outside is transmitted towards the optical fingerprint module.

2. The display screen according to claim 1, wherein the light-shielding panel comprises a first surface towards the display panel and a second surface opposite the first surface, the hollow-out groove runs through from the first surface to the second surface.

3. The display screen according to claim 1, wherein the light-shielding panel is provided with a plurality of hollow-out grooves, and a plurality of optical fingerprint modules is fastened to the plurality of hollow-out grooves respectively.

4. The display screen according to claim 2, wherein the display panel comprises an upper surface and a lower surface opposite the upper surface, and the lower surface is attached to the first surface of the light-shielding panel.

5. The display screen according to claim 1, wherein the plurality of tiny holes are arranged in an array.

6. The display screen according to claim 1, wherein the light-shielding panel is made from foam.

7. The display screen according to claim 1, wherein the display panel comprises a substrate and a display layer, the substrate is superposed on the light-shielding panel, and the display layer is superposed on a side of the substrate away from the light-shielding panel.

8. The display screen according to claim 7, wherein the display panel is a liquid crystal display panel, the substrate is a thin film transistor substrate, and the display layer is a liquid crystal layer.

9. The display screen according to claim 8, wherein the display panel further comprises a colorful substrate attached to a side of the display layer away from the substrate, an upper polarizer attached to a side of the colorful substrate away from the display layer, a lower polarizer attached to a side of the substrate away from the display layer, and a backlight source attached to a side of the lower polarizer away from the substrate.

10. The display screen according to claim 7, wherein the display panel is an organic light-emitting diode display panel, the substrate is a glass substrate, and the display layer is an organic luminescent layer.

11. The display screen according to claim 10, wherein the display panel further comprises an anode layer attached between the display layer and the substrate, a cathode layer attached to a side of the display layer away from the anode layer, and an upper polarizer attached to a side of the cathode layer away from the display layer.

12. The display screen according to claim 1, wherein the display screen further comprises a light-transparent cover plate, the light-transparent cover plate is superposed on a side of the display panel away from the light-shielding panel, and the light-transparent cover plate covers the display panel.

13. The display screen according to claim 12, wherein the light-transparent cover plate is a glass plate, and the light-transparent cover plate and the display panel are bonded together through an optical adhesive.

14. A display device, comprising a display screen and an optical fingerprint module, the display screen comprising a light-shielding panel and a display panel, the light-shielding panel being provided with a hollow-out groove, the hollow-out groove being configured to fasten the optical fingerprint module, the display panel being configured to be superposed on a side of the light-shielding panel towards a user, a side of the display panel towards the light-shielding panel being provided with an ink layer, an orthographic projection area of the ink layer on the light-shielding panel coinciding with the hollow-out groove, and chromaticity of the ink layer being consistent with chromaticity of a side of the light-shielding panel towards the display panel, the optical fingerprint module being fastened to the hollow-out groove;

the ink layer is provided with a plurality of tiny holes, and the plurality of tiny holes are configured so that inductive light of the optical fingerprint module is transmitted;

the plurality of tiny holes comprises a first tiny hole and a second tiny hole, the first tiny hole is configured so that the inductive light emitted by the optical fingerprint module is transmitted outside, and the second tiny hole is configured so that the inductive light reflected from the outside is transmitted towards the optical fingerprint module.

15. The display device according to claim 14, wherein the optical fingerprint module comprises a base, a light emitting source, and a light receiving source, the light emitting source and the light receiving source are both fastened to the base, the light emitting source is configured to emit inductive light to the outside through the display panel, and the light receiving source is configured to receive the inductive light reflected from the outside through the display panel.

16. A mobile terminal, comprising a display device, the display device comprising a display screen and an optical fingerprint module, the display screen comprising a light-shielding panel and a display panel, the light-shielding panel being provided with a hollow-out groove, the hollow-out groove being configured to fasten the optical fingerprint module, the display panel being configured to be superposed on a side of the light-shielding panel towards a user, a side of the display panel towards the light-shielding panel being provided with an ink layer, an orthographic projection area of the ink layer on the light-shielding panel coinciding with the hollow-out groove, and chromaticity of the ink layer being consistent with chromaticity of a side of the light-shielding panel towards the display panel, the optical fingerprint module being fastened to the hollow-out groove;

the ink layer is provided with a plurality of tiny holes, and the plurality of tiny holes are configured so that inductive light of the optical fingerprint module can be transmitted;

the plurality of tiny holes comprises a first tiny hole and a second tiny hole, the first tiny hole is configured so that the inductive light emitted by the optical fingerprint module is transmitted outside, and the second tiny hole is configured so that the inductive light reflected from the outside is transmitted towards the optical fingerprint module.

17. The mobile terminal according to claim 16, wherein the mobile terminal is selected from a group consisting of a mobile phone, a tablet computer, and a notebook computer.

* * * * *